(12) United States Patent
Chao et al.

(10) Patent No.: US 6,314,281 B1
(45) Date of Patent: Nov. 6, 2001

(54) METHOD AND APPARATUS FOR PRECISELY LOCATING A MOBILE UNIT

(75) Inventors: Jim Jingfu Chao, Naperville, IL (US); Eshwar Pittampalli, Randolph, NJ (US)

(73) Assignee: Lucent Technologies Inc., DE (US)

( * ) Notice: Subject to any disclaimer, the term of this patent is extended or adjusted under 35 U.S.C. 154(b) by 0 days.

(21) Appl. No.: 09/114,840

(22) Filed: Jul. 14, 1998

(51) Int. Cl.[7] .......................... H04M 11/00; H04M 3/42; H04Q 7/20
(52) U.S. Cl. .......................... 455/404; 455/414; 455/456
(58) Field of Search .................... 455/404, 456, 455/414, 466; 342/386, 52, 57, 58; 340/825.49

(56) References Cited

U.S. PATENT DOCUMENTS

| 4,818,998 | * | 4/1989 | Apsell et al. ............... 342/444 |
| 5,542,100 | * | 7/1996 | Hatakeyama ............... 455/404 |
| 5,555,286 |   | 9/1996 | Tendler ........................ 379/59 |
| 5,625,678 |   | 4/1997 | Blomfield-Brown ....... 379/93 |
| 5,704,008 |   | 12/1997 | Duvall, Jr. ................... 395/2.82 |
| 5,828,292 | * | 10/1998 | Kokhan ....................... 455/404 |
| 5,960,337 | * | 9/1999 | Brewster et al. ........... 455/404 |
| 6,038,438 | * | 3/2000 | Beeson et al. .............. 455/404 |
| 6,044,257 | * | 3/2000 | Boling et al. ............... 455/404 |

* cited by examiner

Primary Examiner—Nay Maung
Assistant Examiner—Ray Persino

(57) ABSTRACT

A method and system for locating a precise physical location of a distressed enhanced mobile unit comprises use of a distress notification signal. In one embodiment, a distressed mobile unit emanates a predefined distress notification signal upon completion of an emergency services (e.g. 911) call. The distress notification signal is received by a rescue squad enhanced mobile unit in nearest proximity to the distressed enhanced mobile unit. The rescue squad enhanced mobile unit uses the distress notification signal to identify the location of the distressed mobile unit. In some embodiments, an audible distress signal is also issued by the distressed enhanced mobile unit so that rescue personnel can follow the audible signal to a user in distress.

12 Claims, 5 Drawing Sheets

METHOD AND APPARATUS FOR PRECISELY LOCATING A MOBILE UNIT

TECHNICAL FIELD

This invention relates to wireless communications, and more particularly, to locating a distressed user of a wireless (mobile) unit during an emergency situation.

BACKGROUND OF THE INVENTION

The popularity of wireless telephony has grown at an exponential rate over the past several years. As an increasing number of people use wireless telephones as a substitute for traditional wireline telephones, telecommunications service providers must be ready to seamlessly provide service features and facilities normally associated with wireline service to the users of wireless telephony services.

One important and government mandated service required in both wireline and wireless telephony is public safety administration services (also known as emergency or "911" services). The hallmark of 911 service is the ability of the emergency service personnel to view the address of a distressed caller while the call is ongoing. In wireline applications, 911 service is easily administered because the caller uses equipment associated with a fixed address or location. Indeed, the caller's address aids 911 personnel in identifying appropriate emergency services units to respond to the distressed caller's request.

Wireless telephony poses an entirely new challenge for emergency service administration. Due to the very nature of wireless telephony, a distressed caller may be using a mobile unit in any geographic region where wireless service is provided. The challenge for emergency personnel and wireless service providers is to pinpoint the location of a distressed caller so that appropriate emergency service personnel may be dispatched.

Navigation systems, such as global positioning systems, have greatly enhanced the ability of emergency personnel to locate a distressed user of a mobile unit. Indeed, the current state of navigation system art allows the identification of an object within an area of one hundred (100) meters in an east-west dimension and one hundred fifty six (156) meters in a north-south dimension. Even with the impressive accuracy of existing navigation systems, there are situations in which emergency personnel have problems physically reaching a distressed user of a mobile unit. For example, if the distressed mobile unit user is in a high-rise building or a large office complex, the navigation system's resolution falls short of the desired goal of actually identifying the physical location of a distressed caller.

SUMMARY OF THE INVENTION

The need for identifying with greater accuracy the physical location (that is, within 20 meters) of a distressed caller is recognized and a technical advance is achieved in the wireless telecommunications art by the method and apparatus of the present invention. More particularly, the present invention uses a distress notification signal, in combination with a navigation system, to locate a distressed mobile unit user.

In one embodiment, an enhanced mobile unit is capable of operating in normal mode or "distress" mode. In distress mode, a distress notification signal emanates from the mobile. More particularly, a mobile switching center issues a control message to the enhanced mobile unit upon completion of a "911" or other emergency call. The control message instructs the mobile unit to operate in distress notification mode by transmitting a distress notification signal having a particular frequency and pattern. After the emergency call is completed, the mobile switching center also initiates a call to the closest (that is, nearest in geographic proximity) rescue squad mobile unit. The "closest" rescue squad and appropriate emergency personnel are determined using presently available navigation systems which identify a coarse geographic region where the distressed mobile unit user is located.

The rescue squad's mobile unit is also an enhanced mobile unit capable of receiving distress notification signals. Simultaneous with the distressed mobile unit transmitting the distress notification signal, the mobile switching center instructs the rescue squad mobile unit to tune to the frequency and pattern of the distress notification signal. Emergency service personnel in possession of the rescue squad mobile unit proceed toward the distressed mobile user by utilizing a received signal strength indicator on the rescue squad mobile unit to travel in a direction maximizing the received signal strength. In this manner, distress notification mode operation works in conjunction with the navigation system so that a precise, physical location of a mobile user is ascertained.

Advantageously, emergency services personnel are able to determine a more precise physical location of a distressed caller who is not readily identified using a navigation system alone (e.g., a caller trapped in a high-rise building or in a remote region of an office complex). In another embodiment, the distressed caller's mobile unit emanates an audible tone in addition to the distress notification signal so that emergency services personnel can hear a distress signal as the distressed mobile unit user is approached.

DETAILED DESCRIPTION

Figure 1:
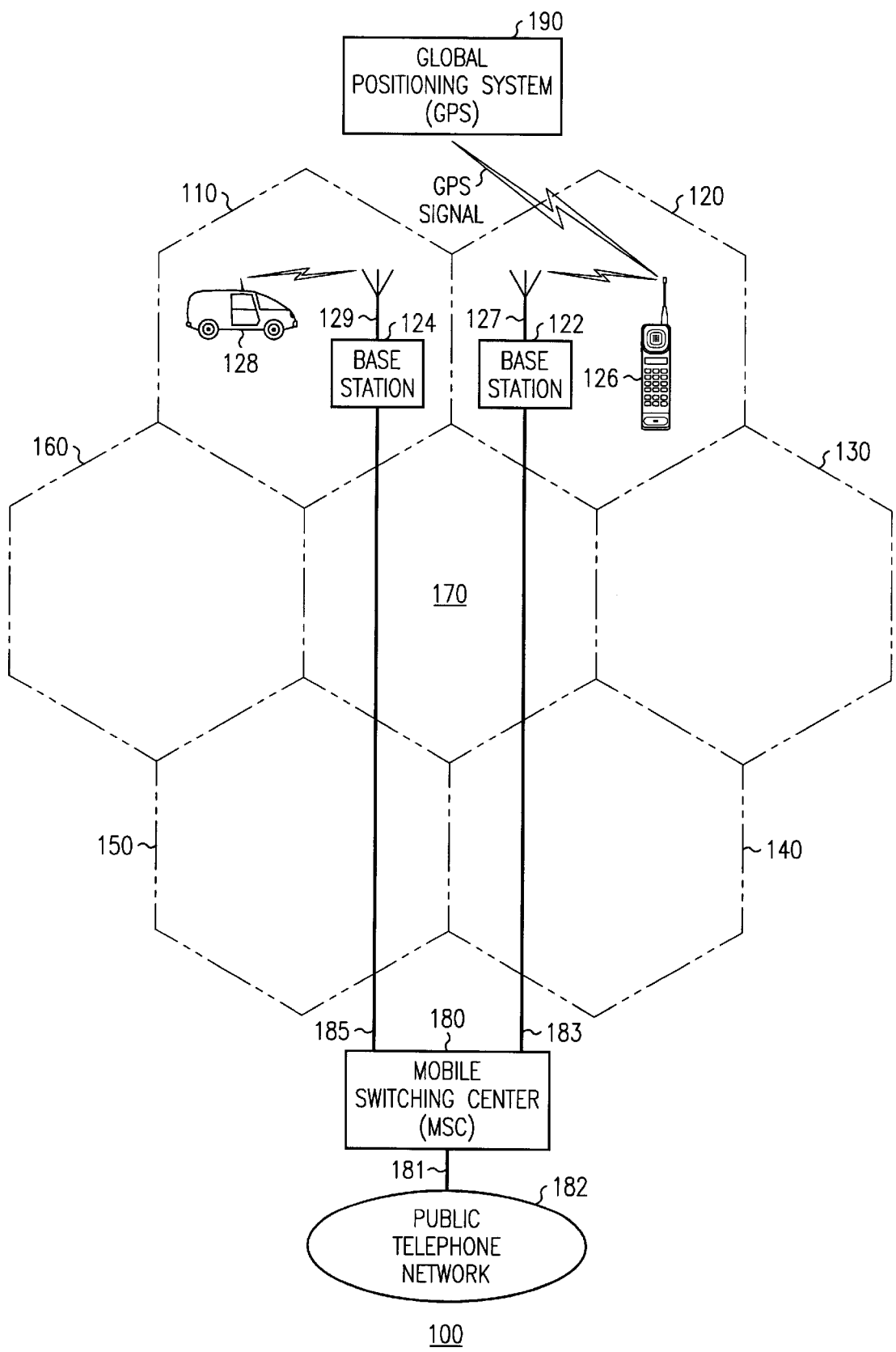
FIG. 1 is a simplified block diagram of a wireless telecommunications system in which the present invention may be practiced.

FIG. 1 shows a simplified block diagram of wireless telecommunications system 100 including a plurality of cell sites 110, 120, 130, 140, 150, 160 and 170 served by mobile switching center (MSC) 180. In turn, MSC 180 is interconnected to public switched telephone network (PSTN) 182 via established link 181.

MSC 180 maintains communication with base stations located in each of the cell sites. In this embodiment, MSC 180 maintains communication links 183 and 185 to base stations 122 and 124, respectively. As shown, base stations 122 and 124 serve enhanced mobile units 126 and 128 located within cell sites 120 and 110, respectively. In this example, enhanced mobile unit 128 is disposed in a rescue squad vehicle. Each base station includes an antenna for radio communication with mobile units located within the cell site. More particularly, base station 122 is served by antenna 127 and base station 124 is served by antenna 129.

Also shown is global positioning system 190 used for identifying a coarse approximate location (that is, within approximately 150 meters) of a mobile unit. Navigation systems are well known in the art and are found in a variety of forms including global positioning systems (GPS), LORAN, OMEGA or SATNAV systems. Each enhanced mobile unit is capable of interfacing with such a navigation system and includes interface equipment for realizing location coordinates.

Each enhanced mobile unit is operable in distress mode such that upon receiving a control message from the MSC, a distress notification signal is transmitted. In an alternative embodiment, an audible distress signal also emanates from the enhanced mobile unit in distress notification mode.

Figure 2:
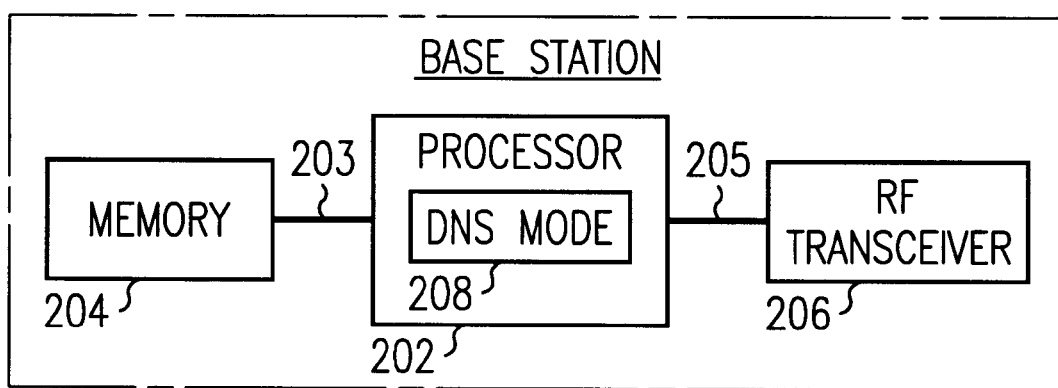
FIG. 2 is a more detailed block diagram of a base station deployed in the wireless telecommunications system of FIG. 1.

FIG. 2 is a block diagram of a base station (such as base station 122) which may be deployed in wireless telecommunications system 100.

In this embodiment, base station 200 comprises processor 202 interconnected to memory 204 and radio frequency transceiver 206 via links 203 and 205, respectively. Base station 122 supports mobile units operating in normal mode unless a signal is received from the base station's serving MSC requiring it to initiate distress mode operation for a particular enhanced mobile unit. The parameters and implementation instructions for distress mode operation are stored in processor 202 in designated area 208. Distress mode signaling is described in detail below.

Figure 3:
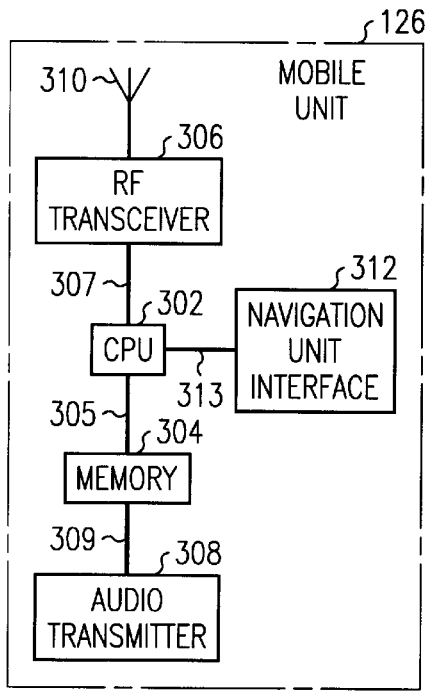
FIG. 3 is a simplified block diagram of an enhanced mobile unit including distress mode capability.

FIG. 3 is a block diagram of an enhanced mobile unit (such as mobile unit 126) shown in FIG. 1 and equipped with distress mode capability. In this embodiment, enhanced mobile unit 300 is deployed in a wireless telecommunications system, such as wireless telecommunications system 100. Mobile unit 300 comprises central processing unit (CPU) 302 interconnected to memory 304 via link 305. Central processing unit 302 is interconnected to radio frequency transceiver 306 via link 307. Also shown is antenna 310 interconnected to RF transceiver 306 and audio transmitter 308 interconnected to memory 304 via link 309. Navigation unit interface 312 is interconnected to central processing unit 302 via link 313. During non-emergency (normal) mode of operation, mobile unit 300 functions in a manner well known in the art. Subsequent to completion of emergency (911) calls, however, the mobile unit operates in distress mode. Emergency telephone numbers are programmed into memory 304 of mobile unit 300 so that completion of a call to emergency dialed digits automatically institutes "distress" mode in some embodiments. In alternative embodiments, distress mode is instituted by a signal received from the mobile switching center via a serving base station as described below. In other embodiments, enhanced mobile unit 126 may include distress signal receiving capability.

Navigation unit interface 312 receives location information from a navigation system, such as global positioning system 190 shown in FIG. 1. Audio transmitter 308 is capable of emitting a loud audible tone when mobile unit 300 operates in distress mode. Similarly, radio frequency transceiver 306 emanates a distinct pattern radio frequency (also known as a distress notification signal) whenever mobile unit 300 operates in distress mode.

Figure 4:
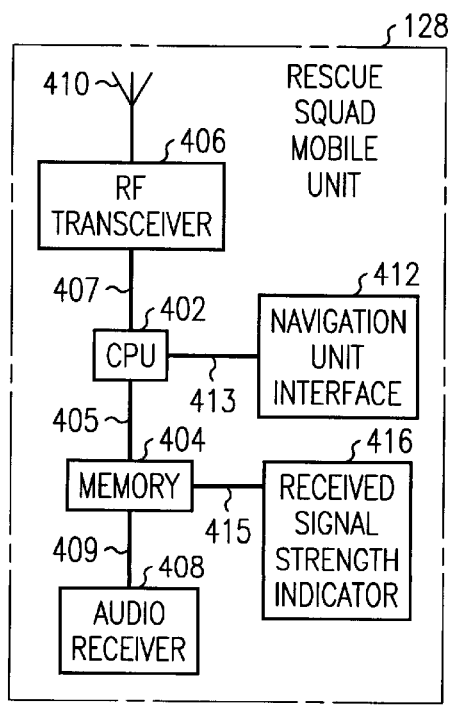
FIG. 4 is a simplified block diagram of a rescue squad enhanced mobile unit including distress signal receiving capability.

FIG. 4 is a simplified block diagram of rescue squad enhanced mobile unit, such as rescue squad enhanced mobile unit 128, shown in FIG. 1. Rescue squad enhanced mobile units are used in conjunction with an enhanced mobile unit such as shown in FIG. 3.

Rescue squad mobile unit 400 comprises central processing unit (CPU) 402 interconnected to memory 404 via link 405. Radio frequency transceiver 406 is interconnected to central processing unit 402 via link 407. Also shown is audio receiver 408 interconnected to memory 404 via link 409. Received signal strength indicator (RSSI) 416 is interconnected to memory 404 via link 415. RSSI 416 is used by emergency services personnel to guage the strength of a signal received from another enhanced mobile unit.

Navigation unit interface 412 is interconnected to central processing unit 402 via link 413. In this embodiment, navigation unit interface 412 is capable of receiving location information from a navigation system such as global positioning system 190. Rescue squad mobile unit 400 may also receive location information from a mobile switching center. Radio frequency transceiver 406 receives the information regarding distress radio signals via antenna 410. More particularly, rescue squad enhanced mobile unit 400 receives information regarding the distress signal frequencies and patterns emanating from the enhanced mobile unit from the mobile switching center via its antenna. The frequency is a distinctive distress notification and is used to locate the mobile unit. More particularly, the signal strength of the distress notification signal received by the rescue squad enhanced mobile unit is monitored on RSSI 416 and used by rescue squad personnel as a guide in locating the distressed user of the mobile unit. In other words, rescue squad personnel endeavor to maximize the signal strength reading on the RSSI when locating the distressed enhanced mobile unit. An optional audio signal generated by the distressed mobile enables rescue squad personnel to use hearing to locate the enhanced mobile and the distressed caller.

Figure 5:
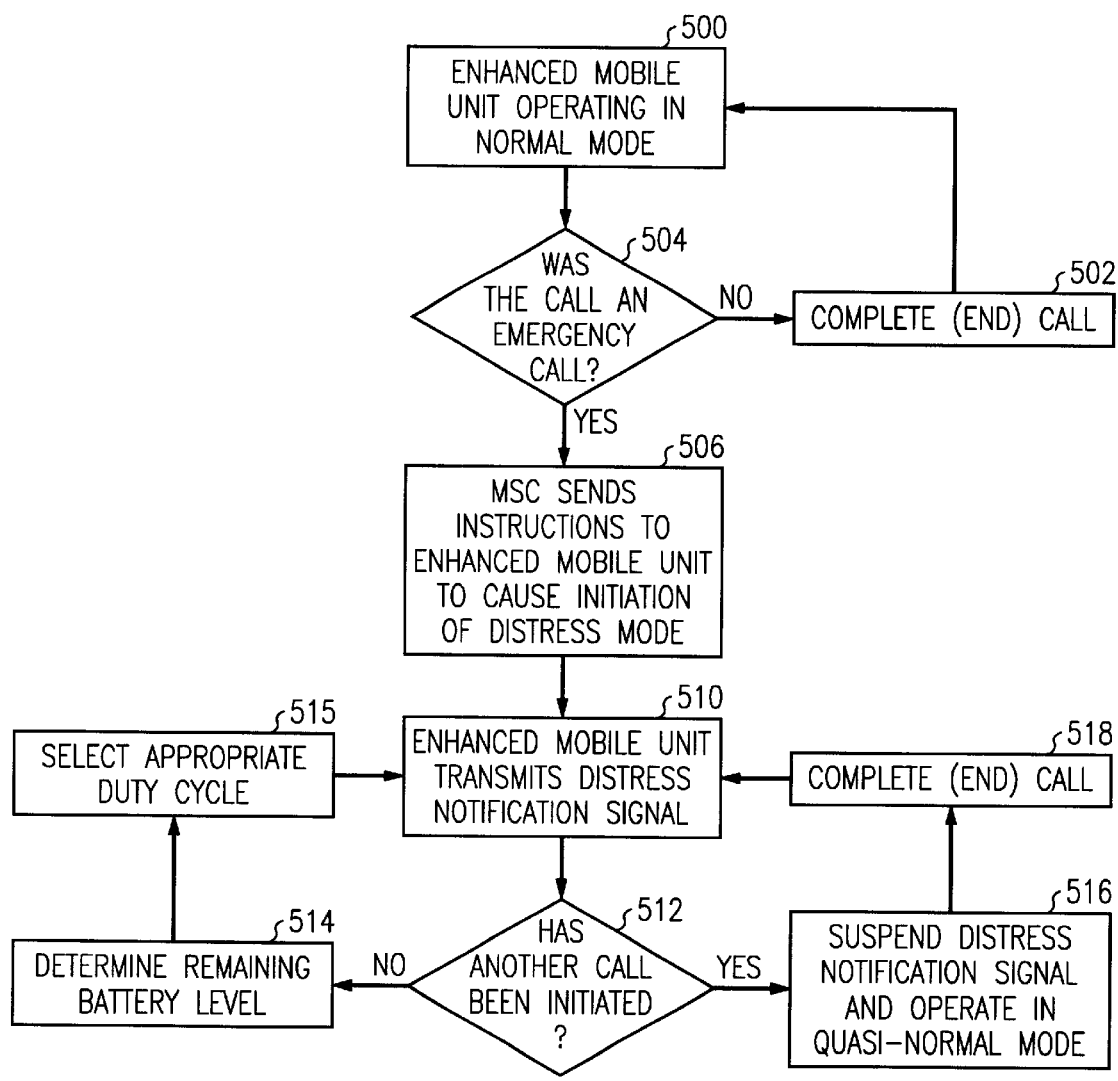
FIG. 5 is a flow diagram illustrating the steps performed in the wireless telecommunications system of FIG. 1.

FIG. 5 is a flow diagram illustrating the steps performed in a wireless telecommunications system by mobile switching center 180, base stations 122, 124, mobile unit 126 and rescue squad mobile unit 128 in accordance with one embodiment of the present invention.

The process begins in step 500 in which a mobile unit originates a call in a normal mode of operation. In decision step 504, mobile switching center determines whether the completed call was an emergency call. Emergency calls are recognized as calls in which predefined digits are dialed. For example, an emergency call is a "911" call.

If the outcome of decision step 504 is a "NO" decision, the call is handled using normal procedures and returns to step 500 after the call is completed in step 502. If the outcome of decision step 504 is a "YES" determination, the process continues to step 506 in which mobile switching center 180 operates in a distress notification signal response mode. In distress notification signal response mode, MSC 180 instructs the base station currently serving the distressed mobile unit to transmit a request to the mobile unit to emanate a distress notification signal. In other words, MSC 180 directs base station 122 to activate distress mode operation instructions as stored in segment 208 of processor 202. Base station 122 transmits a request to enhanced mobile unit 126 instructing the mobile unit to emanate a distress notification signal. In step 510, enhanced mobile unit 126 receives the instruction for emanating a distress notification signal in its central processing unit and activates it radio frequency transceiver so that a specific distress notification signal pattern emanates from its antenna to the surrounding geographic region. Emanation of the distress notification signal pattern continues until a user of the distressed mobile unit elects to make a call. Accommodation of other calls in an emergency situation is necessary should the caller wish to phone other helpful individuals, such as family members.

In decision step 512, mobile unit 126 determines whether another call has been initiated. If the outcome of decision step 512 is a "NO" determination, the process continues to decision step 514 in which the mobile unit checks the battery level and selects an appropriate duty cycle in step 515 of the distress notification signal so as not to completely deplete the battery resources of the enhanced mobile unit while operating in distress mode. If the outcome of decision step 512 is a "YES" determination, the process continues to step 516 in which mobile unit 126 interrupts the distress notification signal. In step 516, mobile unit 126 receives and transmits the digits dialed by a user of the mobile unit to MSC 180 as is known in the art. During the suspended distress notification signal state, the mobile unit operates in a quasi-normal mode (that is, calls may be originated but upon completion of calls, the mobile unit will return to distress mode).

In step 518, the user of the distressed mobile unit ends the call and the process returns to step 510 in which mobile unit 126 returns to distress mode and begins retransmitting the distress signal. In some embodiments, concurrent with transmitting the distress notification signal, the mobile unit also emanates an audible distress signal from an audio transmitter. The audible signal is used by all of those within hearing distance of the distressed enhanced mobile unit so that appropriate assistance may be provided.

Figure 6:
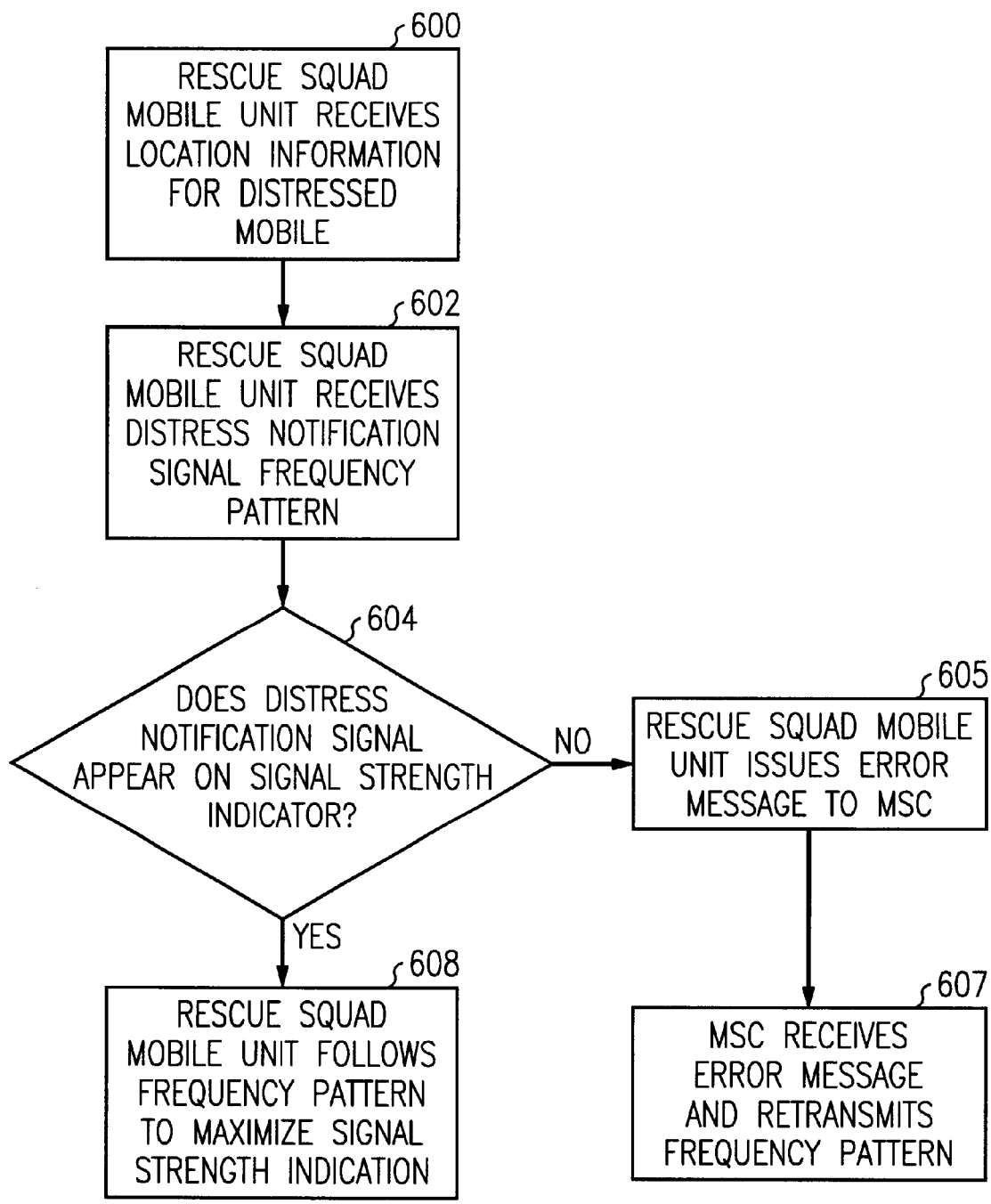
FIG. 6 is a flow diagram illustrating the steps performed in the rescue squad enhanced mobile unit.

FIG. 6 is a flow diagram describing the steps performed by a rescue squad enhanced mobile unit in accordance with one embodiment of the present invention.

In step 600, rescue squad mobile unit 128 receives coarse (within 150 meters) geographic location information for a distressed enhanced mobile unit from a navigation system via MSC 180. In step 602, rescue squad mobile unit 128 receives instructions from MSC 180 requiring it to tune to a particular frequency and pattern to receive the distress notification signal from the mobile unit identified by location information provided in the previous step. In decision step 604, rescue squad mobile unit 128 determines whether the distress notification signal pattern as identified by MSC 180 is being received on its signal strength indicator. If the outcome of decision step 604 is a "NO" determination, the process continues to step 605 in which rescue squad mobile unit 128 issues an error statement to MSC 180. Upon receipt of an error message in MSC 180, the process continues to step 607 in which MSC reissues the distress notification signal pattern to the rescue squad mobile unit. If the outcome of decision step 604 is a "YES" determination, the process continues to step 608 in which the distress notification signal pattern is followed so as to maximize the received signal strength indication on the received signal strength indicator located on the rescue squad mobile unit.

In this manner, emergency personnel equipped with rescue squad mobile units are able to locate a precise physical location of a distressed mobile unit user. Advantageously, the rescue squad mobile unit is used in conjunction with a navigation system so that after pinpointing a general location of the distressed mobile unit (that is, within 150 meters) emergency personnel can locate a precise physical location (that is, within approximately 20 meters) of a distressed enhanced mobile unit user.

Although this invention has been described with respect to illustrated embodiments, those skilled in the art may devise numerous other arrangements without departing from the scope of the invention as defined in the following claims.

What is claimed is:

1. In a wireless telecommunications system serving mobile units, a method for identifying a location of a particular mobile unit comprises:

activating a distressed enhanced mobile unit to emanate a distress notification signal;

locating a rescue squad enhanced mobile unit to respond to the distressed enhanced mobile unit; and notifying the rescue squad enhanced mobile unit of a frequency of the distress notification signal so that the distress notification signal may be used to locate the distressed enhanced mobile unit.

2. The method of claim 1 further comprising the distress enhanced mobile unit completing a call to an emergency service organization prior to the step of activating the distressed enhanced mobile unit to emanate the distress notification signal.

3. The method of claim 1 further comprising the distressed enhanced mobile unit emanating an audible distress notification signal.

4. The method of claim 1 wherein locating a rescue squad enhanced mobile unit comprises the step of:

locating the rescue squad enhanced mobile unit in nearest proximity to the distressed mobile unit.

5. The method for claim 1 further comprising interrupting the distress notification signal to allow a non-emergency call to be placed by the distressed enhanced mobile unit.

6. The method of claim 1 further comprising determining a strength of the distress notification signal and using the strength of the distress notification signal to locate the distressed enhanced mobile unit.

7. An enhanced mobile unit served by a wireless telecommunications system comprising:

a central processor interconnected to a memory;

a radio frequency transceiver interconnected to the central processor;

means for activating a distress notification signal upon termination of an emergency services call; and wherein the radio frequency transceiver interrupts broadcast of the distress notification signal upon origination of a call.

8. The mobile unit of claim 7 further comprising an audio transmitter for emanating an audible distress signal in conjunction with the distress notification signal.

9. The mobile unit of claim 7 further comprising a navigation system interconnected to the central processor to determine a location of the enhanced mobile unit.

10. A rescue squad enhanced mobile unit associated with a wireless telecommunications system comprising:

a central processing unit interconnected to a memory;

a radio transceiver interconnected to a central processing unit for receiving distress notification signals from a distressed mobile unit; and an audio receiver interconnected to the memory unit for receiving audible tones generated from the distressed mobile unit.

11. The rescue squad enhanced mobile unit of claim 10 further comprising:

a received signal strength indicator for responding to the distress notification signals.

12. A wireless telecommunications system comprising:

a mobile switching center that serves an enhanced mobile unit;

the enhanced mobile unit being adapted to interconnect to the mobile switching center via a base station;

wherein the mobile switching center transmits a distress notification activation signal to the enhanced mobile unit so that the enhanced mobile unit emanates a radio frequency distress signal;

wherein the mobile switching center transmits to a rescue squad enhanced mobile unit information allowing the rescue squad enhanced mobile unit to receive the radio frequency distress signal; and wherein the information includes instructions to tune to a particular frequency.

* * * * *